No. 832,612. PATENTED OCT. 9, 1906.
L. KALISCHER.
METHOD OF INSTALLING ELECTRIC OUTLETS AND FIREPROOF WALLS
AND PARTITIONS CONTAINING THE SAME.
APPLICATION FILED SEPT. 25, 1903.
2 SHEETS—SHEET 1.
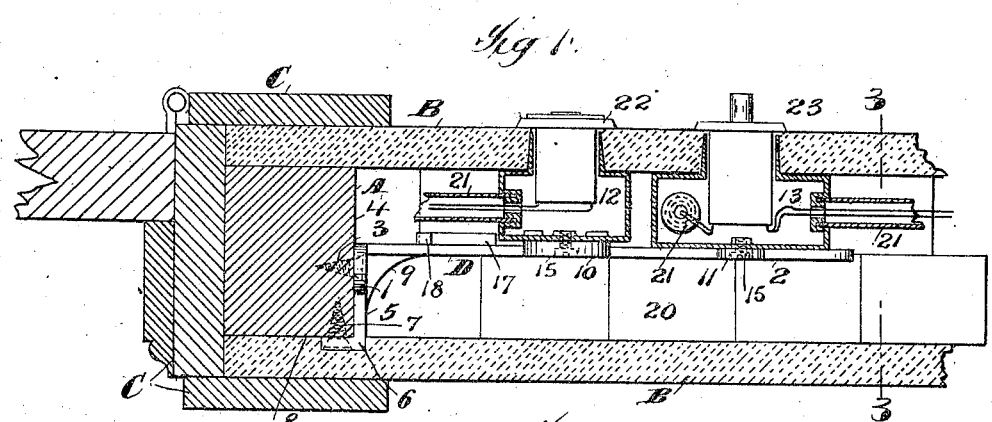
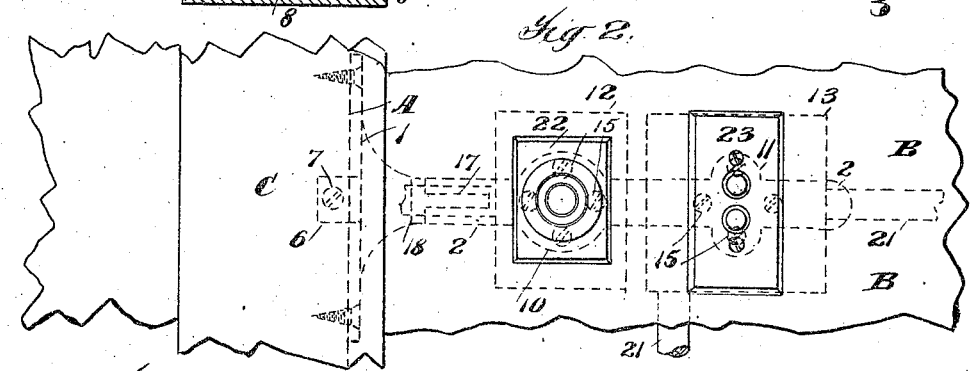
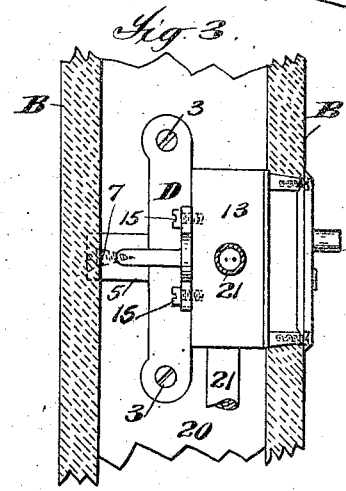
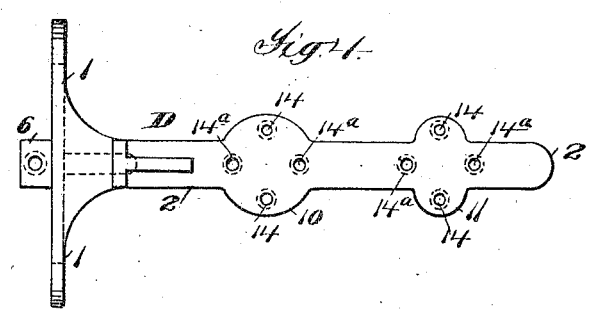
Attest:
Geo. H. Botts
F. Haliani
Inventor
Louis Kalischer
By Philipp, Sawyer, Rice & Kennedy
Attys No. 832,612. PATENTED OCT. 9, 1906.
L. KALISCHER.
METHOD OF INSTALLING ELECTRIC OUTLETS AND FIREPROOF WALLS
AND PARTITIONS CONTAINING THE SAME.
APPLICATION FILED SEPT. 25, 1903.
2 SHEETS—SHEET 2.
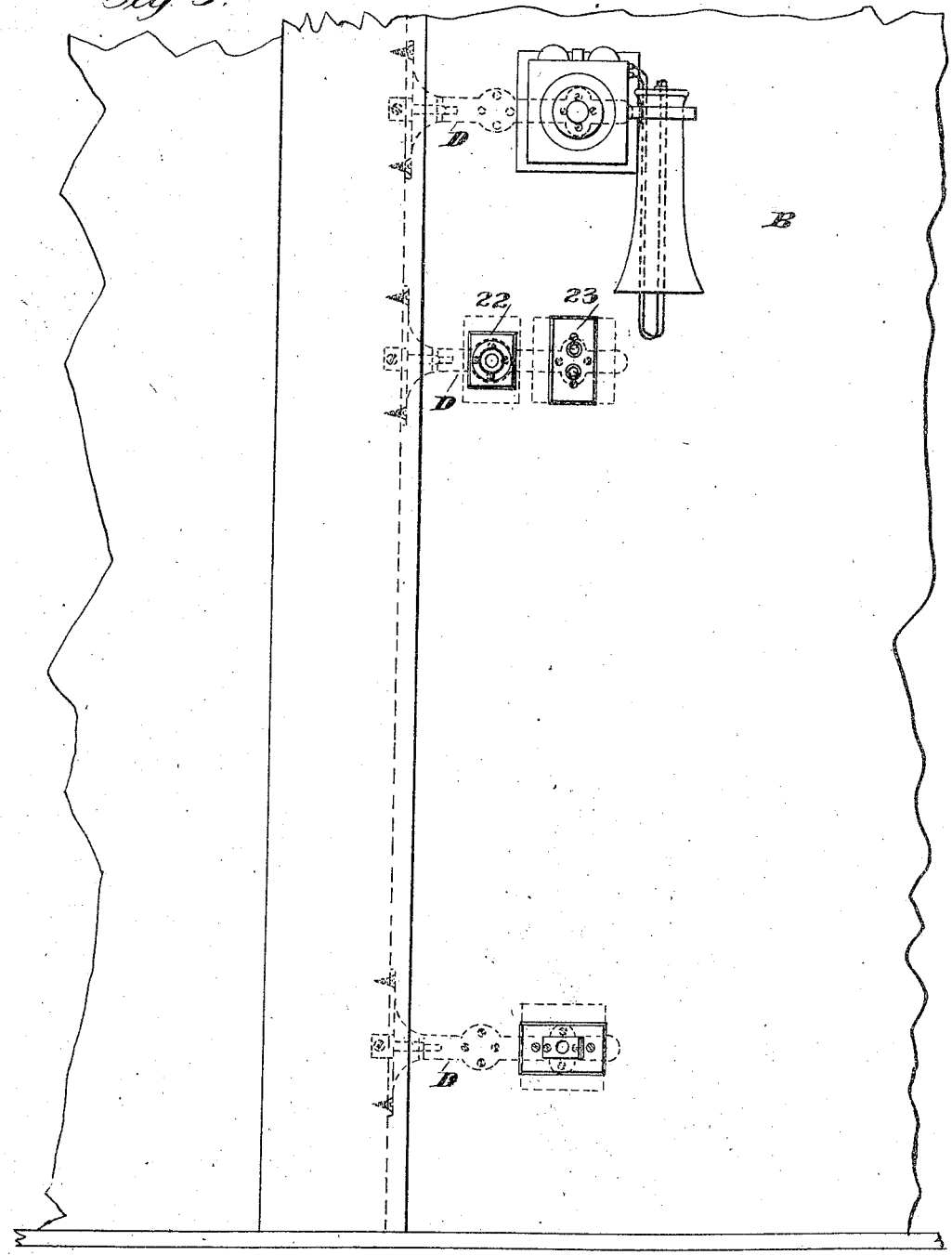

UNITED STATES PATENT OFFICE.

LOUIS KALISCHER, OF BROOKLYN, NEW YORK.

METHOD OF INSTALLING ELECTRIC OUTLETS AND FIREPROOF WALLS AND PARTITIONS CONTAINING THE SAME.

No. 832,612.   Specification of Letters Patent.   Patented Oct. 9, 1906.

Application filed September 25, 1903. Serial No. 174,534.

*To all whom it may concern:*

Be it known that I, LOUIS KALISCHER, a citizen of the United States, residing at Brooklyn, county of Kings, and State of New York, have invented certain new and useful Improvements in Methods of Installing Electric Outlets and Fireproof Walls and Partitions Containing the Same, fully described and represented in the following specification and the accompanying drawings, forming a part of the same.

This invention relates to a method of installing the outlets for electric-light, annunciator, telephone, and other circuits in fireproof walls or partitions, and it also relates to fireproof walls or partitions containing outlets installed in accordance with such method. The term "outlet" as employed herein is intended to apply generally to those receptacles which are located in the brickwork of a fireproof wall or partition and with which the circuit-wires are connected or through which such circuit-wires pass for connection with the poles of a switch or other circuit-controlling means, a telephone, a plug, or other devices, some of these outlets being termed in the trade "outlet-boxes," "outlet-receptacles," "switch-outlets," "switch-boxes," &c. For convenience, however, in the detailed description which will be hereinafter given the improvements of the present invention will be described particularly in connection with the installation of the outlets or outlet-boxes of electric-light and bell or annunciator circuits, such description being sufficient to instruct those skilled in the art as to how to use the present improvements in the installation of outlets used in other electric systems.

According to the present method of installing electric-light and annunciator or bell systems in fireproof partitions or walls (and this is true also as to other systems) the brickwork of the partition or wall is first completed. Chases are then cut therein for iron conduits which serve as raceways through which the wires may be drawn, and clearances are also cut therein for the outlets, the location of these clearances being previously laid out or indicated upon the brickwork. The conduits are then laid in the chases thus cut for them and the outlets set in such clearances, wooden blocks being let into the clearances to which the outlets are screwed. The outlets are then adjusted in the clearances so that they will be in proper alinement relatively to the base of the partition or wall and so that their edges or lips will be in proper relation to the surface line of the plaster to be afterward applied to the brickwork—that is to say, at the proper distance therefrom, which is usually about one thirty-second of an inch. The outlets are then secured in position by means of cement and the wall or partition is finished, as by plastering, an opening, however, being left in the plaster in line with each outlet through which access may be had to the interior of the outlet for the purpose of drawing the wires through the conduits and outlet and connecting them with the circuit-controlling or other devices located in or connected with the outlets. The electrical work is then completed by securing to the lips or edges of the outlets switch-plates, face-plates, canopies, or the like, which cover up said outlets and the openings in the plaster in which they are located. This method of installing outlets is objectionable for many reasons, some of which are the following: In the first place it is expensive, slow, and laborious in that it requires the completion of the brickwork of the partition or wall and then that portions of the partition or wall be removed to provide the chases and clearances for the conduits and outlets, each of which chases and clearances must be cut separately and in the case of the clearances with very great accuracy for reasons which will hereinafter appear. It is also objectionable because of the care and skill which must be exercised in the cutting of the clearance for each outlet and in the adjustment or positioning of the outlet in the clearance in order that such outlet may be in proper alinement with the base-line of the partition or wall and also have its edges or lips properly positioned with reference to the surface or plaster line of the wall when the latter is completed. Such accurate cutting of the clearance and positioning of the outlet therein is necessary for two reasons. In the first place, there is secured to each outlet a face-plate or switch-plate or similar device which is exposed upon the surface of the wall and the position of which upon the surface of the wall is determined by the position in the brickwork of the outlet which it covers. It therefore follows that if an outlet be out of proper alinement with the base-line of the wall or partition the face-plate or switch-plate or the like secured thereto will also be correspondingly out of proper position or alinement relatively to the base of the partition and will thus present an unsightly appearance. In the next place, the face-plates and switch-plates or the like for these outlets are of a standard size designed to be set tightly against the surface of the plastering, and should the outlet be set back too far from the plaster-line long screws will have to be employed for the purpose of securing the face-plate or switch-plate or the like to it, and it will also be necessary to employ a special casing to continue the ironwork of the outlet out to the face of the plaster-line in order to comply with the requirements of the underwriters' rules, the addition of this special casing making a rather costly and unworkmanlike job. Again, if the outlet should be so set or positioned in the brickwork of the wall that the edges or lips thereof project beyond the surface of the plaster the only remedy is to cut out the entire outlet, recut the clearance therefor in the brickwork, and reset and readjust the outlet therein, an item of considerable expense.

It is the object of the present invention to provide a method of installing electric outlets (and a fireproof wall or partition constructed according to the same) in which all of these difficulties are overcome and in which the work of installing such outlets is much simplified and can be performed much more expeditiously than is possible with the methods heretofore practiced. According to the method of installing such outlets provided by the present invention the outlets are first introduced into and properly positioned and supported in the space to be occupied by the partition or wall so as to be in proper alinement with the base-line of the partition or wall and so that their outer edges or lips will also be in proper relation to the surface line thereof and then while the outlets are so positioned and supported building up the wall or partition about them, the wall thus built up being plastered and the wires then drawn through the conduits and outlets and such outlets being covered up by face-plates or switch-plates, canopies, or the like, in the usual manner.

For a better understanding of my invention a detailed description thereof will now be given, reference being had to the accompanying drawings, in which—

Figure 1 is a horizontal section of a wall or partition containing electric-light and annunciator-circuit outlets installed therein in accordance with the present invention. Fig. 2 is a front view of the same. Fig. 3 is a section on the line 3 of Fig. 1. Fig. 4 is a detail of the device employed for supporting and positioning the outlets in the space to be occupied by the wall or partition before the latter is built up. Fig. 5 is a front view of a wall or partition in which are installed a telephone and a plug-outlet in accordance with the present invention in addition to the electric-light and annunciator-circuit outlets of Figs. 1, 2, and 3.

Referring to said drawings, and particularly to Figs. 1 to 4, A is a standard rectangular vertical frame-piece of a wall or partition, to which the plaster B and the trim C of a door or window are attached. This frame-piece may, and, as shown herein, does serve as the support for the outlet supporting and positioning device D, which will now be described. It will be understood, however, that any other suitable means, present in the wall or partition-space either temporarily or permanently, may serve as a support for the device D during the erection of the wall or partition. The positioning and supporting device D is of iron or other suitable material and comprises a base 1 and an arm 2, extending therefrom, preferably at substantially right angles thereto. The base 1 is provided near its extremities with holes through which screws 3 may be passed for securing the base to the side 4 of the frame-piece A. The base 1 is also provided with a lateral extension 5, which rests against the side 4 of the frame-piece A, and this latter extension is also provided with a downwardly-extending portion 6 at right angles thereto, provided with an opening through which a screw 7 may be passed for the purpose of securing it to the adjacent side 8 of the frame A. By means of this construction of the base 1 the latter conforms to the angle formed by the sides 4 8 of the frame-piece A, and when secured to the sides 4 8 it will be held firmly in position on the frame-piece so that it cannot be pulled away or loosened. The supporting and positioning device D may be further strengthened by the addition of a brace 9, extending from the base 1 to the arm 2. The base 1 is such, as will be observed, that it will not only firmly and rigidly support the arm 2 upon the frame-piece A, as just stated, but because of its conformation will when attached to the frame-piece A necessarily assume such a position thereon as to bring the outer edges or lips of the outlets which it supports into the proper position relatively to the plaster-line of the partition or wall, as shown in Fig. 1— that is to say, (according to present methods,) about one thirty-second of an inch behind the plaster-line.

The arm 2 may be of any suitable length, according to the number of outlets which it is intended to support. As shown herein, it is designed to support two such outlets and for this purpose is provided with two outlet-supporting portions or enlargements 10 11, suitably separated from each other, these portions of the arm 2 between and beyond these outlet-supporting portions 10 11 being preferably reduced or made narrower for the purpose of lightness and economy in manufacture. Upon these enlarged portions 10 11 of the arm 2 two outlets 12 13 are supported, the former, 12, of which is designed to contain devices for controlling an annunciator or bell circuit, and the latter, 13, of which is designed to contain devices for controlling an electric-light circuit. Each of these enlargements 10 11 upon the arm 2 is provided with two sets 14 14$^a$ of openings arranged at right angles to each other, through which screws 15 may be passed to secure the outlets 12 13 to said enlargements. The reason for the provision of these two sets of openings 14 14$^a$ in these enlargements 10 11 of the arm 2 is to enable that arm to be used either in the horizontal position illustrated in the drawings or, if desired or necessary, in a vertical position, in which latter case the openings 14$^a$ would be the openings used for securing the outlets to the arm 2, the openings 14 being the ones used, as shown, when the arm 2 is arranged in horizontal position.

Outlets for electric-light, annunciator, telephone, and other circuits are all usually made of standard sizes, all the outlets of the same kind being made usually of the same size. Outlets of different kinds, however, are made of different sizes, the outlets, as 12, for annunicator or bell work, for instance, being of less depth than the outlet, as 13, for an electric-light circuit. (See Fig. 1.) In order, therefore, to adapt the arm 2 for the annunciator-circuit outlet 12 and the electric-light-circuit outlet 13, so that the outer edges or lips of each will when secured to the arm occupy the proper position relatively to the plaster-line of the wall or partition the enlargement 10 to which the outlet 12 is secured is raised or offset so as to project slightly beyond the enlargement 11 for supporting the outlet 13, and thus make up the difference in depth between said outlets 12 and 13, as illustrated in Fig. 1. Similarly if the arm 2 be designed to support other outlets than those illustrated and which differ slightly in thickness to a greater or less extent than the outlets 12 13 such difference in thickness can be compensated for by suitably thickening or thinning the enlargement 10 or 11, as the case may be, to compensate for such difference, or in the case of outlets which may be very materially shallower than the outlets 12 13 suitable distance-pieces may be interposed between them and the supporting-arm 2, so as to bring their outer edges into proper position with relation to the surface or plaster line of the wall or partition.

In order to have the outlet or outlets carried by the arm 2 set plumb or true with relation to the base-line of the partition or wall when the arm 2 is attached to the frame-piece A, said arm may be leveled by means of a spirit-level applied to the arm 2 when in horizontal position or to the base 1 thereof when the arm is arranged in vertical position. I prefer, however, to provide the arm 2 with a rib 17 for receiving the spirit-level when the arm is in horizontal position and with a second rib 18 at right angles thereto for receiving the spirit-level when the arm is arranged in vertical position.

In the installation of the outlets 12 13 in fireproof walls or partitions according to the present invention the positioning and supporting device D is first introduced into the space to be occupied by the wall or partition when built and attached or secured in the manner heretofore described to the frame-piece A or to any other suitable support present temporarily or permanently in the space to be occupied by the wall or partition. When so secured, a spirit-level is applied to the arm 2 or its base 1 (or to the rib 17 or 18) according as the arm 2 is arranged in horizontal or vertical position, and if any change is shown by the spirit-level to be necessary in the position of the arm 2 in order that it and the outlet or outlets thereon shall be in proper alinement relatively to the base-line of the partition such change may be made by loosening one or the other of the screws in the base 1 and then properly adjusting the arm 2 and securing it in its position of adjustment. After the arm 2 has been properly positioned the brickwork of the wall or partition, usually consisting of blocks 20 of fire-brick, will be built up around the outlets 12 13 and the arm 2, so that said brickwork will inclose said outlets and arm, chases being cut in the wall as it is thus built up for the wire-conduits 21. When the wall is built and the plaster applied thereto, the circuit-wires will be drawn through the conduits and into the outlets 12 13 and be connected with circuit-controlling devices contained therein, which in the case shown are operated by push-buttons carried by face-plates or switch-plates 22 23, secured to the outer edges or lips of the outlets 12 13 in the usual manner, as illustrated in Fig. 3.

Although the present invention has been described in detail in connection with outlets for electric-light and annunciator circuits, it is to be understood that it is also useful in connection with outlets and the installation thereof of other kinds of circuits and whether such outlets contain circuit-controlling mean or not. For example, it may be used in connection with the outlet for a telephone-circuit (the base-board of which forms, in effect, the face-plate) or an outlet-plug, as illustrated in Fig. 5. It may also be used in outlets which do not contain circuit-controlling devices.

What is claimed is—

1. A fireproof wall or partition containing electric-circuit wires and a positioning and supporting arm extending along the wall or partition with an outlet thereon for said wires, the wall or partition being built about said arm and outlet so as to inclose the same, substantially as described.

2. A fireproof wall or partition containing electric-circuit wires and a positioning and supporting arm extending along the wall or partition with a plurality of outlets thereon suitably separated from each other longitudinally of the arm, the wall or partition being built about said arm and outlets so as to inclose the same, substantially as described.

3. A fireproof wall or partition containing electric-circuit wires and a positioning and supporting arm extending along the wall or partition with an outlet thereon for said wires, the wall or partition being built about said arm and outlet so as to inclose the same, an opening being provided in the surface of the wall or partition through which access may be had to the outlet, and a face-plate on the wall or partition covering said opening and outlet, substantially as described.

4. A fireproof wall or partition containing electric-circuit wires and a positioning and supporting arm extending along the wall or partition with a plurality of outlets thereon suitably separated from each other longitudinally of the arm, the wall or partition being built about said arm and outlets so as to inclose the same, openings being provided in the surface of the wall or partition through which access may be had to the outlets, and face-plates on the wall or partition covering said openings and outlets, substantially as described.

In testimony whereof I have hereunto set my hand in the presence of two subscribing witnesses.

LOUIS KALISCHER.

Witnesses:
J. A. GRAVES,
W. H. KENNEDY.